United States Patent Office 3,594,393
Patented July 20, 1971

---

3,594,393
USE OF POLYURETHANES AS DEMULSIFIERS
Rudolf S. Buriks, Franklin E. Mange, and Patrick M. Quinlan, St. Louis, Mo., assignors to Petrolite Corporation, Wilmington, Del.
No Drawing. Filed Dec. 18, 1968, Ser. No. 784,928
Int. Cl. B01d 17/00
U.S. Cl. 252—327    9 Claims

ABSTRACT OF THE DISCLOSURE

A process of employing polyurethanes as demulsifiers in preventing, breaking and/or resolving emulsions of the water-in-oil type, and more particularly petroleum emulsions.

---

This invention relates to the use of polyurethanes in preventing, breaking or resolving emulsions of the water-in-oil type, and particularly petroleum emulsions. Their use provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

These novel demulsifying agents provide an economical and rapid process for breaking and separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil (i.e. desalting).

Demulsification, as contemplated in the present application, includes the preventive step of commingling the demulsifier with the hydrocarbon phase. Similarly, such demulsifiers may be mixed, emulsified, suspended, etc. in the aqueous component.

Demulsification, as contemplated in the present application, also includes the use of an electric field in conjunction with the polyurethanes.

The compositions employed in this invention are the reaction products of isocyanates or their equivalents with oxyalkylates capable of reacting with an isocyanate. The products formed contain at least one urethane group, i.e. an ester-amide of carbonic acid, i.e.

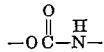

but preferably a plurality of urethane groups, i.e. polyurethanes.

The oxyalkylates which are employed herein are generally known as oxyalkylated compositions or sometimes known as polyalkyleneethers or polyoxyalkylene alcohols or ethers. Most of these contain in at least one place in the molecule, and often in several places, an alkanol or a polyalkyleneether glycol group. The possible variations in oxyalkylates are legion.

For example, the oxyalkylates may be derived from 1,3, or 1,4 instead of 1,2 oxiranes, for example from those having the following formulae:

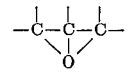

etc. as illustrated by trimethylene oxide (oxy-cyclobutane)

$$CH_2-CH_2-CH_2 \underset{O}{\diagdown\diagup} \longrightarrow (-CH_2CH_2CH_2-O)_n$$

and derivatives thereof, for example

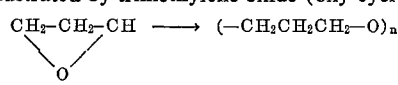

where R and R' which may be the same or different are hydrocarbon or a substituted group, such as

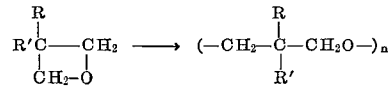

etc.

Another alkylene oxide which can be polymerized is 1,4-epoxycyclohexane:

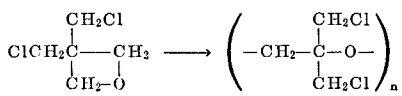

and derivatives thereof; and tetrahydrofurane

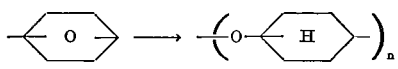

These may be homopolymerized or copolymerized with 1,2 oxiranes or other oxides to yield the oxyalkylates employed in this invention.

In addition, formaldehyde or equivalents can be employed to prepare the oxyalkylates or to modify the oxyalkylates, for example by the use of materials as represented in the following examples:

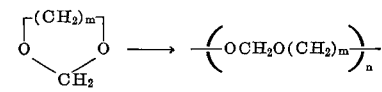

where $m=2,3,4$, etc.

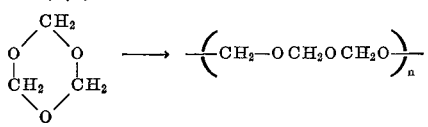

As is well known, alkylene oxides can be reacted with various oxyalkylatable materials (i.e. materials which contain hydrogen atoms capable of reacting with a 1,2 alkylene oxide) to form polyalkylene oxide derivatives thereof. Thus, where an oxyalkylatable material of the formula $ZH_z$ is reacted with an alkylene oxide such as ethylene oxide, there is obtained a compound of the formula

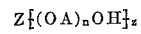

such as

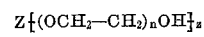

where $n$ is a number determined by the moles of alkylene oxide reacted and $z$ is a number determined by the compounds oxyalkylatable hydrogens.

Many polyalkylene oxide block polymers have been prepared containing definite homogeneous block units or segments of ethylene oxide, propylene oxide, butylene oxide, etc., such as disclosed in U.S. Pats. 2,674,619, 2,677,700 and elsewhere.

Where ethylene oxide is reacted with water, a polymeric polyethylene glycol of the type $H(OEt)_n$—O—$(EtO)_nH$ is formed. Similarly, where propylene oxide is reacted with water, a polymeric polypropylene glycol of the type $H(OPr)_n$—O—$(PrO)_nH$ is formed. When water is first reacted with ethylene oxide followed by reaction with propylene oxide, a polymer containing blocks of ethylene oxide units and blocks of propylene oxide are formed, $H(OPr)_m(OEt)_nO$—$(EtO)_n(PrO)_mH$, or when added in the reverse order the following block polymer is formed:

$$H(OEt)_m(OPr)_nO(PrO)_m(EtO)_mH$$

Block polymers of this type can be formed by adding infinite numbers of block units, for example, $$H(OPr)_y(OEt)_x(OPr)_m(OEt)_n\text{—O—}(EtO)_n(PrO)_m(EtO)_x(PrO)_yH$$

This block-wise or sequential addition could be continued infinitely. Since only two types of alkylene oxides are employed, these polymers are di-block polymers.

Where three or more different types of alkylene oxides are employed, ter-block polymers are formed as illustrated by sequentially adding ethylene oxide, propylene oxides, and butylene oxides to water to form $$H(OBu)_x(OPr)_m(OEt)_n\text{—O—}(Eto)_n(PrO)_m(BuO)_xH$$

These ter-block units may also be continued infinitely. Where, for example, other alkylene oxides are used in addition to ethylene, propylene, and butylene oxides, a higher type of block polymer is formed, such as when octylene oxide or styrene oxide are additionally reacted. It is to be noted the block units of these polymers within themselves are homogeneous units, i.e., each block is derived from a single alkylene oxide.

Polyalkylene oxides have also been prepared by reacting mixtures of alkylene oxide such as when a mixture of ethylene oxide and propylene oxide is reacted. When this is done, a random or hetero-polymer is obtained as contrasted to the homoblock polymer previously described. Thus, for example, where a 50/50 molar mixture of EtO and PrO is reacted with an oxyalkylatable material, such as water, one obtains a polymer having no orderly arrangement of the alkylene oxide units since the distribution of EtO and PrO units in the molecule is random. This type of material may be designated by

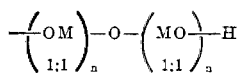

where MO represents a random distribution of EtO and PrO units such as, for example $$H(OPr)_5(OEt)_2(OPr)_4(OEt)_5(OPr)_2\text{—O—}(EtO)_3(PrO)(EtO)_5(PrO)_3(EtO)(PrO)H$$

Carbide & Carbon sells these mixed glycols under the "Ucon" trademark. Wyandotte sells similar glycols under the "Pluronic" label. Several other commercial products of similar types are on the market.

It is to be noted that in multiple units an ethylene oxide polymer is hydrophilic whereas a propylene oxide having 10–20 or more units or a butylene oxide polymer are hydrophobic.

MO as employed herein refers to mixtures of ethylene oxide in conjunction with a hydrophobic alkylene oxide, i.e. an alkylene oxide having more than two carbon atoms. Thus, the hydrophobic alkylene oxides include propylene oxide, butylene oxide, amylene oxide, octylene oxide, styrene oxide, methylstyrene oxide, cyclohexene oxide, etc. However, in practice we prefer to employ ethylene oxide in conjunction with propylene and/or butylene oxide.

The molar ratio of EtO to hydrophobic oxide, for example PrO and BuO, can vary widely, for example from 1:100 to 100:1 EtO:PrO, but may be 1:50 to 50:1. However, for certain properties we prefer the molar ratio to be from 6:1 to 1:6 EtO:PrO, with an optimum ratio of 2:5 to 5:2 EtO:PrO. Where mixtures of PrO:BuO and EtO are employed as the hydrophobic oxide, the molar ratios of PrO:BuO inter se can be similarly varied to the same ratios.

To indicate the types of polyoxyalkylene glycols useful in the present invention, the following table is presented. This table illustrates the various commercially available materials and the variety of other materials known to the art and readily available by the process known as "oxyalkylation" of suitable starting materials containing "reactive hydrogen atoms" in their molecules.

The term "reactive hydrogen atom" is well-known and clearly understood by those skilled in the art. However, to remove any possible ambiguity in this regard the term reactive hydrogen atom, as used herein includes any oxyalkylatable hydrogen atom i.e., a hydrogen atom sufficiently labile to open the epoxide ring of an alkylene oxide).

For simplicity sake, the examples given in Table I limit themselves to dipropylene glycol as the reactive hydrogen atoms containing starting material.

TABLE I

Group 1.—Commercially available polyoxyalkylene glycols; e.g.:
Wyandotte_____ "Pluronic" polyols.
Dow Chemical___ "Voranol" polyols.
"Polyglycol E" series, 200, 300, 400, 600, 1,000, 2,000, 4,000, etc.
"Polyglycol P" series, 250, 400, 1,200, 2,000, 3,000 4,000.[1]
Union Carbide___ "Carbowax" series, PPG 425, 1,025, 2,025,[1] etc.
Jefferson Chemical. "Thanol" series, etc.

Group 2.—Products derived form dipropylene glycol by catalzyed oxyalkylations with various weight portions of alkylene oxides, in sequence, for example products prepared by the following additions. DPG is dipropylene glycol.

| | Weight parts | | |
|---|---|---|---|
| | DPG | PrO | EtO |
| (a) | 1 | 30 | 2 |
| (b) | 1 | 30 | 4 |
| (c) | 1 | 30 | 6 |
| (d) | 1 | 30 | 8 |
| (e) | 1 | 30 | 10 |
| (f) | 1 | 44 | 5 |
| (g) | 1 | 44 | 9 |
| (h) | 1 | 70 | 30 |
| (i) | 1 | 85 | 40 |
| (j) | 1 | 100 | 50 |
| (k) | 1 | 110 | 60 |
| (l) | 1 | 125 | 70 |

Group 3.—Products derived by oxyalkylation of dipropylene glycol with mixtures of oxides for example:

| | Weight of— | |
|---|---|---|
| | DPG | PrO/EtO, 2:1 ratio mixture |
| (m) | 1 | 15 |
| (n) | 1 | 25 |
| (o) | 1 | 35 |
| (p) | 1 | 45 |
| (q) | 1 | 75 |
| (r) | 1 | 100 |
| (s) | 1 | 125 |

Group 4.—Products derived by mixing different proportions of specific materials from the general classes as listed under Groups 1 to 3 for example:
(t) 2 parts of PPG 4,000+1 part PEG [2] 2,000.
(u) 5 parts of Carbowax 1,025+3 parts of Thanol G400.
(v) 10 parts of Pluronic L61+7 parts of Pluronic F38.
[1] Numbers indicate molecular weight. PPG is polypropyleneglycol.
[2] PEG is polyethyleneglycol.

To those skilled in the art, the few examples given the above table will make it obvious that a limitless variety of oxyalkylates or their mixtures can be used.

The isocyanates employed herein are compositions containing at least one isocyanate group such as 1–4 or more isocyanate groups, for example 2–3 isocyanate groups, but preferably 2 isocyanate groups. For convenience, these may be represented by the formula R—(CNO)$_n$ where R is the non-isocyanate moiety such as a hydrocarbon group, i.e. alkyl, alkenyl, alkynyl, cycloalkyl, aryl, heterocyclic, etc., or substituted derivatives thereof, etc., and $n=1-4$ or more, but preferably two.

Representative examples of isocyanates are the polymethylene diisocyanates such as ethylene diisocyanate, trimethylene diisocyanate, tetramethylene diisocyanate, pentamethylene diisocyanate, etc.; the alkylene diisocyanates such as propylene-1,2-diisocyanate, butylene-1,2-diisocyanate, butylene 1,3-diisocyanate, butylene-2,3-diisocyanate; the alkylidene diisocyanates such as ethylidene diisocyanate, butylidene diisocyanate, and heptylidene diisocyanate. The cycloalkylene diisocyanates such as cyclopentylene-1,3-diisocyanate, cyclohexylene - 1,2 - diisocyanate, cyclohexylene-1,4-diisocyanate; the aromatic diisocyanates such as m-phenylene diisocyanate, p-phenylene diisocyanate, 1-methylphenylene-2,4-diisocyanate, 1-methylphenylene-2,6-diisocyanate, mixture of these 3,3'-bitolylene-4,4'-diisocyanate, napthylene - 1,4 - diisocyanate, naphthylene-1,5-diisocyanate; xylylene - 1,4-diisocyanate, xylylene-1,3-diisocyanate, 4,4'-diphenylenemethane diisocyanate, 4,4'-diphenylenepropane diisocyanate, etc.

Substituted isocyanates can also be employed, for example, substituted derivatives of the above and other compounds containing halogens, sulfur, oxygen, etc. containing groups for example:

1-chloro-2,4-phenylene diisocyanate,

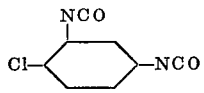

3,3'-dimethoxy-4,4'-diphenylene diisocyanate

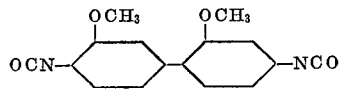

4,4'-sulfonylbis(phenyl isocyanate),

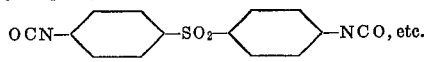

The diisocyanates of the types listed above are the ones which are most preferred for purposes of this invention. Examples of compounds containing more than two reactive groups —N=C=O which can be used are 1,2,4-benzene triisocyanate, butane-1,2,2-triisocyanate, etc.

The oxyalkylates and the isocyanates are reacted in any suitable manner. In general, the reaction is carried out by contacting the oxyalkylate and isocyanate under conditions that cause reaction to occur. In practice, the reaction is carried out by reacting the oxyalkylate at a temperature sufficiently high to prepare the urethane group but not sufficiently high to cause decomposition and/or appreciable cross-linking. In practice, temperatures of 60° C. or greater, such as 60° to the decomposition point, for example 60° C. to 150° C. but preferably 100°±20 are employed. Both reactants may be heated together or one reactant may be added to others taking into consideration that fact that the reaction is exothermic. Since the product is usually used as a solution, the reaction is generally carried out in a non-reactive solvent such as for example a hydrocarbon solvent.

Any time sufficient to cause reaction may be employed such as for example 1–24 hours.

Since suitable reaction time is a function of temperature, where lower temperatures are employed longer reaction times are required. In the case of a polyfunctional reactant, longer reaction time tends to yield a compound of higher molecular weight. Since the reaction is promoted by certain catalysts, such as organo metallic compounds, they are generally employed to achieve higher molecular weights.

For the sake of idealization, the reaction will be illustrated by the reaction of a difunctional oxyalkylate with a difunctional isocyanate to form a polyurethane as illustrated by the following formula:

P(HO(AO)$_n$H + OCN—R—NCO) ⟶

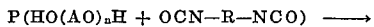

These polymers may be terminated by either a isocyanate or an oxyalkylate group or both. For example, they may be represented as follows:

In addition, because of certain reactive hydrogen groups in the chain of the polymer, cross-linking may also occur. In addition cross-linking can be effected by the use of trifunctional or higher functional isocyanates and/or oxyalkylates.

The present invention encompasses both linear and cross-linked polymers provided the cross-linked polymer is soluble or dispersible in the medium in which it is employed and can perform its function.

The invention will be illustrated by the linear polymer formed from a difunctional oxyalkylate and a diisocyanate, which will yield a polymer containing recurring units of the following structure:

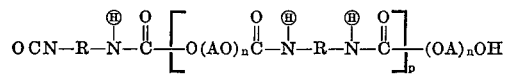

The above formula is an idealized formula. In practice, some cross-linking may occur.

The amounts of glycol and isocyanate to be reacted together can vary within wide limits. Ideally for two difunctional materials the amounts should be such that equivalent amounts of —OH and isocyanate groups will be available. An excess of diisocyanate above this 1:1 ratio is usually avoided, to prevent free isocyanate groups from ending up in the product. Usually a ten to fifteen percent excess of diol over diisocyanate is recommended. For convenience the final condensate is often treated with some mono alcohol, to make sure that any remaining isocyanate group will be eliminated to prevent gellation due to cross-linking during a later period.

However, cross-linked polymers may be employed in this invention provided the polymer is soluble in the system in which it is employed. Besides being cross-linked, the polymer may be terminated by isocyanate and/or hydroxy groups.

The following examples are presented for purpose of illustration and not of limitation.

GENERAL PROCEDURE

The oxyalkylate is dissolved in benzene and the reaction mixture is heated to remove water azeotropically. A nickel octoate catalyst or a dibutyl-tin dilaurate catalyst is then added. After dehydration a dry benzene solution of the isocyanate is added to the oxyalkylate, portion wise so that the exotherm is controlled. The reaction mixture is heated to reflux for about two hours to yield the polyurethane. Some isopropanol is added and reflux continued for half an hour, to finish the product.

In order to save repetitive details and since all products are similarly prepared, a few examples will be presented in tabular form.

TABLE II

| Ex. | Oxyalkylate Name | Mol. wt. | Moles | Isocyanate Name | Moles | Reaction conditions Time, hr. | Temp., degrees | Solvent | Catalyst | Product |
|---|---|---|---|---|---|---|---|---|---|---|
| 1 | PPG "Carbowax" | 2,000 | 1 | TDI | 1 | 3 | 80 | Benzene | N.O. | Viscous at 40%. |
| 2 | do | 3,000 | 1 | TDI | 1 | 3 | 80 | do | N.O. | Do. |
| 3 | do | 2,000 | 1 | HDI | 1 | 3 | 80 | do | N.O. | Do. |
| 4 | PPG "Thanol" | 4,000 | 1 | HDI | 1 | 3 | 80 | do | N.O. | Do. |
| 5 | Table I (t) | | 1 | TDI 80/1 | 1 | 3 | 80 | do | DBTDL | Do. |
| 6 | Table I (e) | | 1 | "NIAX" TDI 80/20 | 1 | 3 | 80 | do | DBTDL | Do. |
| 7 | Table I (h) | | 1 | "NIAX" TDI 80/20 | 1 | 3 | 80 | do | DBTDL | Do. |
| 8 | Table I (v) | | 1 | "NIAX" TDI 80/20 | 1 | 3 | 80 | do | DBTDL | Do. |
| 9 | Table I (u) | | 1 | "NIAX" TDI 80/20 | 0.8 | 3 | 80 | do | N.O. | Do. |
| 10 | Table I (k) | | 1 | TDI | 1 | 4 | (¹) | Toluene | DBTDL | Viscous at 25%. |
| 11 | Table I (h) | | 1 | TDI | 0.6 | 3 | (¹) | Xylene | None | Viscous at 45%. |
| 12 | Table I (o) | | 1 | HDI | 0.8 | 4 | 80 | Benzene | N.O. | Viscous at 50%. |
| 13 | Table I (e) | | 1 | Isonate 143L | 1 | 3 | 100 | Xylene | DBTDL | Extremely viscous at 25%. |
| 14 | Table I (d) | | 1 | Wyandotte TDI | 1 | 3 | 100 | Toluene | DBTDL | Viscous 40% solution. |
| 15 | Table I (e) | | 1 | Niax TDI | 1 | 3 | 80 | do | DBTDL | Extremely viscous at 40%. |
| 16 | Pluronic P85 | | 1 | Isonate 143L | 1 | 3 | 80 | Xylene | DBTDL | Extremely viscous at 35%. |
| 17 | Table I (e) | | 1 | TDI 65/35 | 1 | 3 | 80 | do | DBTDL | Do. |
| 18 | do | | 1 | MDI | 1 | 3 | 80 | do | DBTDL | Do. |
| 19 | do | | 1 | CDI-X | 1 | 3 | 80 | do | DBTDL | Do. |

¹ Reflux.

NOTE.—In the above table TDI is toluene diisocyanate; HDI is hexamethylene diisocyanate; Isonate 143L is a liquid form of HDI; CDI-X is an experimental Union Carbide diisocyanate; N.O. in the catalyst is nickel octoate; DBTDL is dibutyltindilaurate; TDI 80/20 and TDI 65/35 are commercially available mixtures consisting of 80(65) mole percent 2,4 diisocyanate and 20(35) mole percent toluene-2,6 diisocyanate.

The polyethanes can be derived from copolymers of more than one alkyleneoxide, such as copolymers of EtO +PrO, mixtures of homopolymers of alkylene oxides such as physical mixture of glycols derived from EtO and PrO and/or physical mixtures of copolymers of EtO+PrO, etc. Glycols derived from EtO can be made hydrophobic by admixing it with a hydrophobic glycol such as polypropylene glycol.

The polymers of this invention are unexpectedly superior to the oxyalkylates they were derived from in resolving W/O emulsions. These polymers are soluble in a solvent other than water, and preferably soluble in aromatic type solvents, for example having a solubility of at least about 1% by weight, but preferably at least about 5% in an aromatic solvent. They often exhibit dual solubility.

These solubilities may be in an aromatic hyrdocarbon solvent alone (benzene, toluene, etc.,) or in conjunction with other solvents, for example, lower alkanols (1–50% alkanol in aromatic solvent) such as methanol, ethanol, propanol, etc.

Although a wide variety of polyoxyalkylates can be used to prepare the materials of the present invention, the homopolymers of ethylene oxide are not preferred in W/O demulsification because they are too water-soluble and even though their polyurethanes show solubility in organic solvents, they usually partition into the aqueous phase during the demulsification process where they are largely ineffective. However, ethylene oxide can be part of a copolymer composition and its use in a copolymer is particularly beneficial in that it gives a balanced solubility due to its hydrophilic nature. Thus, when higher alkylene oxides are used it is often advantageous to copolymerize them with ethylene oxide. Where propylene oxide is used, some ethylene oxide may be advantageously employed, generally in amounts of less than 50 mole percent and preferably less than 30 mole percent. Other hydrophilic oxides such as methyl glycidyl ether (which like ethylene oxide have a carbon to ether oxygen ratio of 2 to 1) display activity somewhat related to ethylene oxide, and here again it is necessary to use copolymers with hydrophobic oxides. (In general, the term hydrophobic oxide includes compounds in which the carbon to oxygen ratio would preferably be greater than about 2.5.)

Thus, in W/O demulsification polyurethane polymers derived from alkylene oxides which contain a sufficient number of hydrophobic oxyalkylene units in the polymer chain to make them substantially insoluble in water but soluble in organic solvents are often employed. Hydrophobic oxyalkylene units are defined herein as being derived from alkylene oxides having more than two carbon atoms.

These polymers employed in the treatment of oilfield emulsions are used as such, or are preferably diluted with any suitable solvent, for example, aromatic solvents, such as benzene, toluene, xylene, tar acid oil, sulfur dioxide extract obtained in the refining of petroleum, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents miscellaneous solvents, such as pine oil, acetone, carbon tetrachloride, etc., can also be employed as diluents. Similarly, the material or materials employed as the demulsifying agent of our process are often admixed with a mixture of the above solvents or other solvents customarily used in connection with the conventional demulsifying agents. The compositions of this invention may be used alone or in admixture with other suitable demulsifying agents.

In practicing our process for resolving petroleum emulsions of the water-in-oil type, a treating agent or demulsifying agent of the kind herein described is brought into contact with or is caused to act upon the emulsion to be treated, in any of the various apparatus now generally used to resolve or break petroleum emulsions with a chemical reagent, the above procedure being used alone or in combination with other demulsifying procedures, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, gas separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of this invention is placed at the well-head where the effluent liquids leave the well. This reservoir or container, which may vary from about a gallon to 50 gallons or more for convenience, is connected to a proportioning pump which injects the demulsifier drop-wise into the fluids leaving the well. Such chemicalized fluids pass through the flow line into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:10,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:20,000, 1:50,000, or the like. However, with extremely difficult emulsions higher concentrations of demulsifier can be employed.

The polymers of this invention can be employed alone, in solution or in conjunction with other chemical demulsifiers.

In recent years pipeline standards for oil have been raised so that an effective demulsifier must not only be able to break oil field emulsions under conventional conditions without sludge, but at the same time it must also yield bright pipeline oil, i.e., pipeline oil that is free from the minute traces of foreign matter, whether suspended water or suspended emulsion droplets due to non-resolvable solids. In addition the water phase should be free of oil so as not to create a disposal problem. Thus it is presently desirable to use a demulsifier that produces absolutely bright, haze-free oil in the top layer, yields little or no interphasial sludge, and has little if any oil in the water phase.

The following demulsification examples are presented for purposes of illustration and not of limitation.

USE EXAMPLES

The polyurethanes derived from polyoxyalkyleneglycols as described in this invention are superior reagents for resolving water-in-oil emulsions. The method employed for evaluating these materials is the "Bottle Test" described in "Treating Oil Field Emulsions," second edition, issued by Petroleum Extension Service and the Texas Education Agency in cooperation with the American Petroleum Institute, 1955 (revised 1962), pages 39–44.

The effectiveness of the present demulsifiers is based on their ability to resolve oil field emulsion with a minimum amount of reagent to yield bright oil that is essentally free of water and unresolved emulsion and meets pipeline specification (normally less than 1% BS & W). Of particular advantage is the ability of the present demulsifiers to break petroleum emulsions very rapidly on comparison with conventional demulsifiers.

Example A

An emulsion was taken from the Dixie Field, Okla. (L. H. Foster, Producer, Scott Lease, Well No. 2, containing 78% water) the demulsifier was added as a 1% solution to 100 ml. of the emulsion at ambient temperature. It was then hand shaken one hundred times and then allowed to quietly settle. The treated top oil was then analyzed for remaining water.

| Product used | Solution, ml. | Percent water,[1] |
|---|---|---|
| Commercial compound in use | 1.0 | 0.6 |
|  | 0.6 | 1.6 |
|  | 0.2 | 10.0 |
| Compound from Example 17 | 1.0 | 0.2 |
|  | 0.6 | 0.2 |
|  | 0.2 | 0.8 |
| Compound from Example 18 | 1.0 | 0.8 |
|  | 0.6 | 0.8 |
|  | 0.2 | 1.2 |
| Compound from Example 19 | 0.6 | 0.3 |
|  | 0.2 | 1.2 |

[1] In treated oil after 90 minutes.

Example B

An emulsion was taken from the Bolivar Coast Field (Shell Oil producer, Laguna Owen Composite Sample, containing 27% water). The demulsifier was added at 180° F. and shaken in for 5 minutes at 180 shakes per minute. After a short heating period at 180° F. the shaking procedure was repeated once more. The emulsion was finally allowed to settle at 180° C. for a sixteen to eighteen hour period and the top oil was then analyzed for remaining water.

| Product used | Product used, p.p.m. | Water in top oil, percent |
|---|---|---|
| Commerical compound in use | 160 | 2.4 |
|  | 140 | 6.4 |
|  | 120 | 5.2 |
| Compound from Example (e) Table I | 160 | 21.0 |
|  | 140 | 21.0 |
|  | 120 | 26.0 |
| Compound from Example 13 Table II | 160 | 0.8 |
|  | 140 | 1.2 |
|  | 120 | 2.0 |
| Compound from Example 18 Table II | 160 | 1.8 |
|  | 140 | 2.6 |
|  | 120 | 2.2 |

As can be seen in this example, the polyurethanes are very effective materials, whereas the diol from which they are derived has only very low, if any demulsifying properties.

As is quite evident, new oxyalkylates and isocyanates constantly developed which could be useful in this invention. It is therefore not only impossible to attempt a comprehensive catalogue of such compositions, but to attempt to describe the invention in its broader aspects in terms of specific chemical names would be too voluminous and unnecessary. This invention lies in the use of suitable oxyalkylates and isocyanates in preparing the compositions of this invention and their individual composition is important only in the sense that their properties can effect their use. To precisely define each specific oxyalkylate and isocyanate in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of oxyalkylates and isocyanates suitable for this invention. In analogy to the case of a machine wherein the use of certain materials of construction or dimensions of parts would lead to no practical useful result, various oxyalkylates and/or urethanes will be rejected as inapplicable for the uses of this invention where others would be operative. We can obviously assume that no one will wish to make a useless composition or will be misled because it is possible to misapply the teachings of the present disclosure in order to do so. Thus, any oxyalkylate and isocyanate that can yield a suitable product can be employed.

Having thus described our invention what we claim as new and desire to obtain by Letters Patent is:

1. A process of preventing, breaking or resolving emulsions of the water-in-oil type which is characterized by subjecting the emulsion to the action of a polyurethane prepared by reacting polyalkyleneether glycol with organic isocyanate.

2. The process of claim 1 where said organic isocyanate is organic diisocyanate.

3. The process of claim 2 where polyalkyleneether glycol contains hydrophobic alkylene oxide.

4. The process of claim 3 where said hydrophobic alkylene oxide is propylene oxide.

5. The process of claim 4 where polyalkyleneether glycol is polypropyleneether glycol.

6. The process of claim 4 where polyalkyleneether glycol is a copolymer of ethylene and propylene oxides.

7. The process of claim 3 where polyalkyleneether glycol is a physical mixture of a plurality of polyalkyleneether glycols.

8. The process of claim 7 where said physical mixture is (1) a mixture of polypropyleneether glycols and polyethyleneether glycols or (2) a mixture of copolymers of propylene oxide and ethylene oxide.

9. The process of claim 3 where polyalkyleneether glycol is prepared by catalyzed oxyalkylation of 1 weight part dipropylene glycol first with 30 weight parts of propylene oxide and then with 10 weight parts of ethylene oxide.

References Cited

UNITED STATES PATENTS 2,987,515   6/1961   Stromberg _____ 252—357

JOHN D. WELSH, Primary Examiner

U.S. Cl. X.R.

252—331, 328, 344